(12) United States Patent
Gil et al.

(10) Patent No.: US 12,524,378 B2
(45) Date of Patent: Jan. 13, 2026

(54) DOCKING STATION FOR CONNECTED GLASSES AND METHOD FOR SYNCHRONIZING CONNECTED GLASSES TO THIS DOCKING STATION

(71) Applicant: Essilor International, Charenton-le-Pont (FR)

(72) Inventors: Paul Gil, Amiens (FR); Bruno Amir, Saint Maur des Fosses (FR); Daniel Tang, Villemomble (FR); Jean Sahler, Antony (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 17/809,437

(22) Filed: Jun. 28, 2022

(65) Prior Publication Data

US 2023/0018418 A1 Jan. 19, 2023

(30) Foreign Application Priority Data

Jul. 16, 2021 (EP) .................................... 21306001

(51) Int. Cl.
*G06F 16/178* (2019.01)
*G06F 1/16* (2006.01)
(Continued)

(52) U.S. Cl.
CPC .......... *G06F 16/178* (2019.01); *G06F 1/1632* (2013.01); *H04W 4/38* (2018.02); *H04W 4/80* (2018.02)

(58) Field of Classification Search
CPC ...... G06F 16/178; G06F 1/1632; G06F 1/163; G06F 1/1684; G06F 3/011; G06F 3/012;
(Continued)

(56) References Cited

U.S. PATENT DOCUMENTS 9,258,033 B2 * 2/2016 Showering .............. H04W 4/80
2010/0081377 A1 * 4/2010 Chatterjee ............. G06F 1/1632
455/41.1
(Continued)

FOREIGN PATENT DOCUMENTS

WO WO 2020/257354 A1 12/2020

OTHER PUBLICATIONS

European Search Report issued Dec. 16, 2021 in European Application 21306001.5 filed Jul. 16, 2021, 8 pages.
(Continued)

*Primary Examiner* — Jared M Bibbee
(74) *Attorney, Agent, or Firm* — Oblon, McClelland, Maier & Neustadt, L.L.P.

(57) ABSTRACT

The invention relates to a docking station (1) for connected glasses (3), comprising:
a support for positioning the connected glasses (3),
a downlink communication module configured to receive input data from a communication unit of the connected glasses (3),
a memory unit configured to store said input data to obtain stored data,
an uplink communication module configured to transfer output data obtained from said stored data to a backend platform (5) in order to synchronize a database of the backend platform (5) with said input data.

14 Claims, 1 Drawing Sheet

Figure 1:
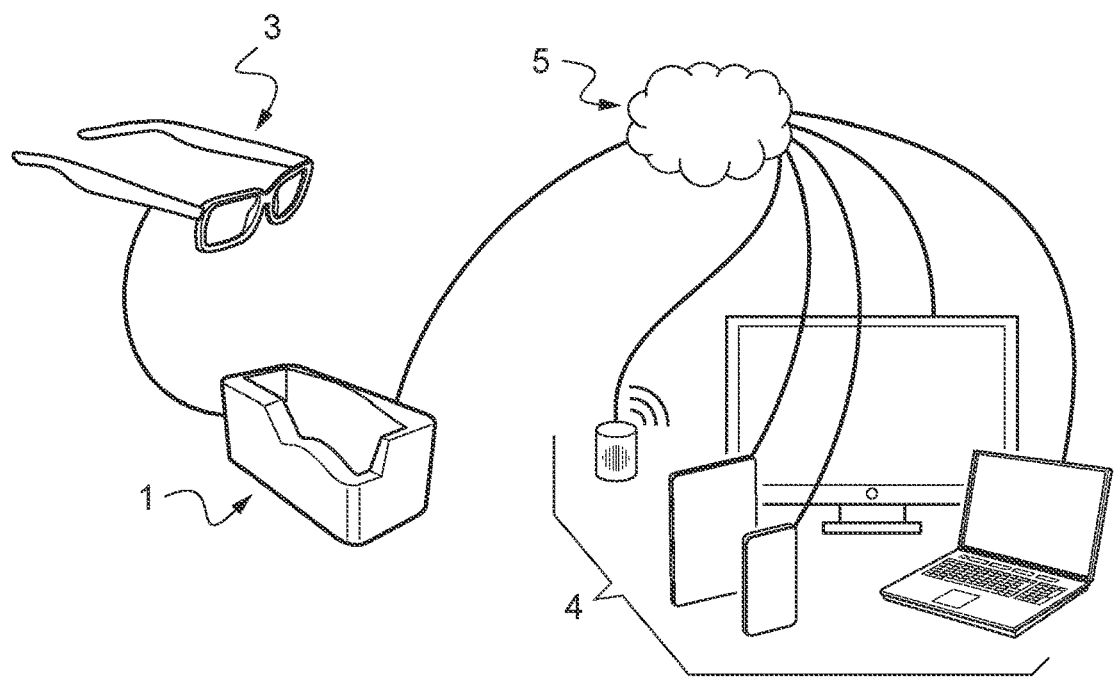

(51) Int. Cl.
*H04W 4/38* (2018.01)
*H04W 4/80* (2018.01)

(58) Field of Classification Search
CPC ...... H04W 4/38; H04W 4/80; H04L 67/1095; H04L 67/12
See application file for complete search history.

(56) References Cited

U.S. PATENT DOCUMENTS

| | | | |
|---|---|---|---|
| 2010/0245585 A1* | 9/2010 | Fisher | H04N 7/18 348/240.99 |
| 2013/0215374 A1* | 8/2013 | Blum | G06K 19/07762 351/158 |
| 2013/0329183 A1* | 12/2013 | Blum | G06F 3/013 351/158 |
| 2015/0365573 A1* | 12/2015 | Kim | H04N 23/663 348/376 |
| 2018/0102606 A1* | 4/2018 | Tham | H01L 27/0266 |
| 2020/0209628 A1* | 7/2020 | Sztuk | G02B 27/0176 |
| 2021/0251309 A1* | 8/2021 | Tang | A61B 5/27 |
| 2022/0304603 A1* | 9/2022 | Freckleton | G16H 50/20 |

OTHER PUBLICATIONS

Office Action issued Jun. 25, 2025 in Chinese Patent Application No. 202210810190.8, with English translation.

\* cited by examiner

DOCKING STATION FOR CONNECTED GLASSES AND METHOD FOR SYNCHRONIZING CONNECTED GLASSES TO THIS DOCKING STATION

TECHNICAL FIELD

The present invention relates to the field of data exchange with connected glasses.

The present invention relates in particular to a docking station for connected glasses and methods for synchronizing connected glasses with a backend platform and for obtaining synchronized data from a backend platform and pertaining to input data from connected glasses.

BACKGROUND INFORMATION AND PRIOR ART

Connected glasses (also called "smart glasses") are wearable computer glasses that can have several applications. Connected glasses may in particular collect data from internal or external sensors. They also may control or retrieve data from other instruments or computing devices. Those data may be sent to a backend platform for storage and processing and once processed, used and analysed by a final client.

Two main kinds of connected glasses are known.

The connected glasses of the first kind are fully autonomous connected glasses that can use wireless technology, such as LTE technology (3G, 4G or 5G for instance), to send data directly to the backend platform. Those kinds of connected glasses however suffer from constraints of size and energy consumption, and thus do not represent a usual solution for long-time wearing of connected glasses.

The connected glasses of the second kind use short-range communication technologies. In this solution, an intermediary communication device is used to transfer data from connected glasses to the backend platform. This intermediary communication device is for instance a smartphone, to which the connected glasses may be linked, using short-range communication technologies such as NFC or Bluetooth technologies. The intermediary communication device then sends the data received from the connected glasses to the backend platform. This solution however requires having such intermediary communication device available for use and being skilled to pair the device intermediary communication to the connected glasses.

A solution to ease the synchronization of connected glasses data is thus needed.

SUMMARY OF THE INVENTION

In this context, the present invention proposes a docking station for connected glasses, comprising:
 a support for positioning the connected glasses,
 a downlink communication module configured to receive input data from a communication unit of the connected glasses,
 a memory unit configured to store said input data to obtain stored data,
 an uplink communication module configured to transfer output data obtained from said stored data to a backend platform in order to synchronize a database of the backend platform with said input data.

Therefore, the docking station according to the invention aims at easing the synchronization between connected glasses and a backend platform, by playing the role of a gateway constituting a relay between the connected glasses and the backend platform. Therefore, the connected glasses do not need to be equipped with burdening components and can keep a tiny form factor while presenting a low energy consumption.

Moreover, no intermediary portable communication device is needed for the synchronization between the connected glasses and the backend platform. The docking station can be permanently accessible and placed at a convenient location.

Other advantageous and non-limiting features of the docking station according to the invention are:
 the support has a shape adapted to receive and maintain the connected glasses to protect from shocks, and wherein the coatings and coverings in contact with the connected glasses prevent scratches of the frame and the lenses of the connected glasses;
 the docking station embeds a sensor configured to detect if the connected glasses are positioned on the support;
 the sensor is an optical sensor or a magnetic sensor;
 the docking station embeds a magnetic field generating element;
 the support comprises at least one electrical connector configured to be connected with one connected glasses electrical connector when the connected glasses are positioned on the support;
 the docking station further comprises a calibration unit configured to calibrate or recalibrate sensors embedded in the connected glasses when the connected glasses are positioned on the support;
 the docking station further comprises additional sensors configured to measure data relating to the environment of the docking station;
 the additional sensors are chosen among at least one of: a temperature sensor, an air humidity sensor, an air quality sensor, a light sensor, a microphone, a camera, a motion sensor, a proximity sensor or a touchscreen;
 the uplink communication module is further configured to receive uplink data from the backend platform as well as Internet data, and the docking station further comprises an interface configured to transmit information related to said output data, and/or information coming from additional sensors embedded in the docking station, and/or information related to the uplink data, and/or information related to the Internet data.

The invention further proposes a method for synchronizing a database of a backend platform with input data from connected glasses, comprising the steps of:
 positioning the connected glasses onto a support of a docking station,
 receiving from a communication unit of said connected glasses, by a downlink communication module of said docking station, said input data,
 obtaining stored data by storing said input data in a memory unit of said docking station,
 transferring, by an uplink communication module of said docking station, output data obtained from said stored data to the backend platform in order to synchronize a database of the backend platform with said input data, wherein the output data are optionally obtained by means of a processing step of said stored data.

The method for synchronizing the database of the backend platform with input data from the connected glasses may comprise a step of triggering the step of receiving, by the downlink communication module of said docking station, said input data, wherein the step of triggering is related to the position of the connected glasses relative to the position of the docking station.

The step of triggering may comprise one among:
  detecting, by the communication unit of the connected glasses, a wireless signal emitted by the docking station,
  detecting, by the docking station, a wireless signal from the communication unit of the connected glasses,
  detecting, by a magnetic sensor embedded in the connected glasses, a magnetic field emitted by at least one magnetic field generating element embedded in the docking station,
  detecting, by a magnetic sensor of the docking station, a magnetic field emitted by at least one magnetic field generating element embedded in the connected glasses,
  detecting, by an electrical sensor of the connected glasses, an electrical signal from an electrical connector of the support of the docking station,
  detecting, by an electrical sensor of the docking station, an electrical signal from an electrical connector of the support of the docking station,
  detecting, by a sensor embedded in the docking station, that the connected glasses are positioned on the support.

The downlink communication module of the docking station may use a short-range communication technology and the uplink communication module of the docking station may use a long-range communication technology.

The method may further comprise the steps of:
  measuring, by additional sensors embedded in the docking station, data that relate to the environment of the docking station, said data being also measured by connected glasses sensors embedded in the connected glasses,
  re-adjusting settings of the connected glasses sensors, based on a combination of the data measured by the additional sensors and the data measured by the connected glasses sensors.

The method may further comprise the steps of, for obtaining, by a client, data synchronized with input data from connected glasses:
  accessing, by the client, to the backend platform,
  downloading, by the client, raw data stored in the database of the backend platform, said raw data originating from said output data.

DETAILED DESCRIPTION OF EXAMPLE(S)

Figure 2:
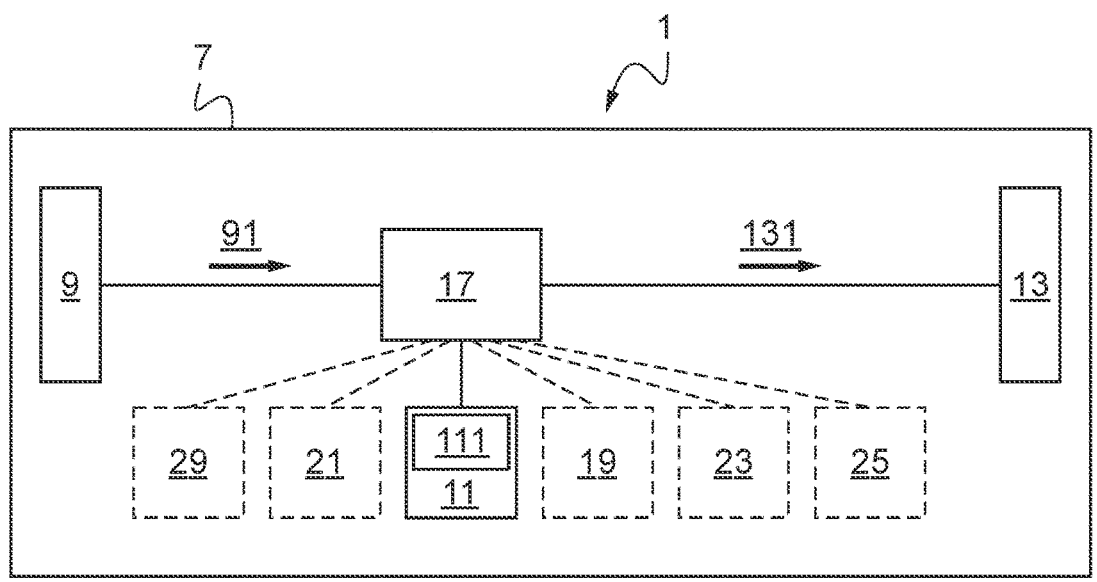

The following description, enriched with joint drawings that should be taken as non-limitative examples, will help understand the invention and figure out how it can be realized. On the appended drawings:

FIG. 1 represents the principle of data synchronization between a backend platform and the connected glasses via a docking station according to the invention;

FIG. 2 schematically represents the main components of the docking station according to the invention.

FIG. 1 represents the principle of data synchronization between connected glasses 3 of a user and a backend platform 5 via a docking station 1 according to the invention.

The backend platform 5 may be an external server. By "external server", it is meant that the docking station 1 and the connected glasses 3 are located in the same place, on the contrary to the external server, which is located in another place. This backend platform 5 is for instance a remote server like a cloud server.

The connected glasses 3 (also named hereinafter smart glasses) are adapted to communicate with the docking station 1, which then communicates with the backend platform 5. The docking station 1 serves as a relay between the connected glasses 3 and the backend platform 5, playing the role of a gateway. When the synchronization is performed, a client 4 may interact with the backend platform 5 by using the synchronized data of the backend platform 5 for analysis purposes.

The connected glasses 3 embed an internal control unit, connected glasses sensors configured to detect data, and a communication unit. The internal control unit may include an internal power source, for instance a rechargeable battery, and one or more processors, memory, and hardware to provide an operating environment for executing programmable operations to process data detected by the sensors.

In the context of detecting the connected glasses wearing time by the user, the connected glasses sensors may comprise a motion sensor such as an accelerometer or an inertial measuring unit (IMU), a capacitive sensor, an infrared proximity sensor, an AMR (anisotropic magneto resistive) sensor, a temperature sensor, an inclinometer, or any combination of those.

The connected glasses sensors may also include GPS sensors providing data indicative of a location of the eyeglasses 3, and/or a radar or a sonar providing data indicative of distances between the eyeglasses 3 and other objects, and/or image capturing devices configured to capture image data representative of the environment surrounding the user when he wears the eyeglasses 3.

The connected glasses sensors may also include eye tracking cameras providing data representative of the direction of the user's gaze.

The data detected by the connected glasses sensors are stored in the memory of the connected glasses 3 and may undergo processing by the one or more processors of the connected glasses 3.

The communication unit may receive the data stored in the memory of the connected glasses 3, optionally processed by the one or more processors of the connected glasses 3 and is configured to transfer those data to the docking station 1.

The communication unit may use any short-range communication technology to transfer data from the connected eyeglasses 3. For instance, the short-range communication technology maybe chosen among a Bluetooth low energy technology, an near field communication (NFC) technology, a 433 MHz technology, a light fidelity (LiFi technology) or any other wireless technology FIG. 2 represents schematically the main components of the docking station 1 for connected glasses 3 according to the invention. The docking station comprises a support 7, a downlink communication module 9, a memory unit 11 and an uplink communication module 13. The docking station 1 is supplied with power, for instance by being connected to a power outlet via a power cord, or with a battery, or any other power supplying means.

The support 7 is configured to host connected glasses 3 of a user when the user wants to synchronize input data 91 collected by his connected glasses 3 with a database of the backend platform 5.

The support 7 may be a moulded plastic case, comprising a recess dedicated to maintain the connected glasses 3 in a fixed position when the user places the connected glasses 3 onto the support 7. It also delimits an internal housing for other components such as the downlink communication module 9, the memory unit 11 and the uplink communication module 13.

The downlink communication module 9 is configured to receive the input data 91 sent by the communication unit of the connected glasses 3 when the connected glasses 3 are positioned on the support 7, or when the connected glasses 3 are close to the docking station 1.

The downlink communication module 9 may use any short-range communication technology to receive the input data 91. For instance, the short-range communication technology maybe chosen among a Bluetooth low energy technology, an NFC technology, a 433 MHz technology, a LiFi technology or any other wireless technology.

The memory unit 11 is configured to store the input data 91 received by the downlink communication module 9. The input data 91 stored in the memory unit 11 are referred as stored data 111.

The uplink communication module 13 is configured to transfer output data 131 obtained from the stored data 111 to the backend platform 5. The uplink communication module 13 may use any long-range communication technology to transfer the output data 131. For instance, the long-range communication technology may be chosen among a WiFi technology, such as based on an IEEE 802 protocol, or a long term evolution (LTE) technology, such as 3G, 4G or 5G, or a nbIOT (narrowband Internet of the Things) technology. As a variant, the uplink communication module 13 may use an Ethernet wired connection. In this case, the uplink communication module 13 comprises an RJ 45 cable configured to connect the docking station 1 to an Ethernet socket.

Advantageously, the uplink communication module 13 is also configured to receive uplink data from the backend platform 5.

The uplink communication module 13 is also configured to connect the docking station 1 to the Internet by using any of the long-range communication technology cited above, or any other long-range communication technology.

Additionally, the docking station 1 comprises a processing unit 17 configured to control the functioning of the docking station 1. The processing unit 17 may, for example, be embodied in the docking station 1 in a variety of ways, for instance by including processing elements with integrated circuits. The processing unit 17 is configured to control and communicate with any electronic element embedded in the docking station 1, such as the downlink communication module 9, the memory unit 11, the uplink communication module 13 or for instance any sensor embedded in the docking station 1.

The processing unit 17 is further configured to process the stored data 111. For instance, the processing unit 17 may code and modulate the stored data 111 to obtain the output data 13, so that the output data are in accordance with the long-range communication technology used by the uplink communication module 13.

In a preferred embodiment, the docking station 1 embeds a sensor 19 configured to detect if the connected glasses 3 are positioned on the support 7.

As a first example of this embodiment, the sensor 19 is an optical sensor, for instance consisting of an infrared LED coupled to a photodiode. In this case, when the connected glasses 3 are positioned on the support 7, the optical sensor may detect a change in a signal delivered by the photodiode illuminated by the infrared LED.

As a second example of this embodiment, the sensor 19 is a magnetic sensor, adapted to detect a magnetic field emitted by the connected glasses 3. For instance, the magnetic sensor can be an anisotropic magneto-resistive (AMR) sensor, or any magneto-sensitive sensor. In this case, the connected glasses 3 emit a magnetic field thanks to an embedded magnet or an NFC field embedded in its frame.

As a third example of this embodiment, the sensor 19 is an electrical sensor. In this example, the support 7 includes at least one electrical connector configured to be connected with one electrical connector included in the connected glasses 3 when the connected glasses 3 are positioned on the support 7. When the connected glasses 3 are positioned in the support 7, the electrical sensor of the docking station 1 detects a signal originating from the physical connection between the connected glasses 3 and the support 7.

As a fourth example, the sensor 19 is constituted by NFC means adapted to detect the connected glasses 3.

In an embodiment of the invention, the connected glasses 3 embed a dedicated sensor configured to detect if they are positioned on the support 7 of the docking station 1.

As an example of this embodiment, the docking station 1 comprises a magnetic field generating element 21. The magnetic field generating element 21 is for example a physical sequence of magnets varying in amplitude or polarity, or an electro-magnet broadcasting an activation cycle. The magnetic field generated by the magnetic field generating element 21 is meant to be detected by the dedicated sensor of the connected glasses 3. In a variant, the magnetic field generating element 21 of the docking station 1 may be a static magnet In another variant, the magnetic field generating element 21 of the docking station 1 may be a magnet that presents a frequency or any dynamic code that ensures that it will be recognized by the dedicated sensor of the connected glasses 3 as coming from the docking station 1, so that the one or more processors of the connected glasses can initiate the synchronization process, or a calibration process, or a charging process as will be described below.

Advantageously, the docking unit 1 further comprises a calibration unit 25 configured to calibrate or recalibrate connected glasses sensors embedded in the connected glasses 3 when the connected glasses 3 are positioned on the support 7.

In pursuit of this goal, the docking station 1 uses for instance measurements from additional sensors 23 embedded in the docking station 1 and configured to measure data that relate to the environment of the docking station 1 and that are also measured by the connected glasses sensors. Examples of additional sensors 23 are: a temperature sensor, an air humidity sensor, an air quality sensor, a light sensor such as a UV light sensor or a camera, an ambient light sensor, or a spectrophotometer measuring a dedicated optical spectral bandwidth.

The docking station 1 uses in combination the information measured by these additional sensors 23 and the information measured by the connected glasses sensors
   to re-adjust settings of the connected glasses sensors that might have drifted due to temperature or air humidity evolutions since a previous calibration.

Advantageously, the docking station 1 may also update a firmware of the connected glasses, for instance, by downloading the latest firmware updates from the Internet and uploading it in the connected glasses 3.

Advantageously, the docking station 1 may comprise a charging unit adapted to recharge a battery of the connected glasses 3 or to load a super capacitor embedded in the connected glasses 3. The charging process can be a wireless charging process by means of a transmitter embedded in the docking station 1 and using radiofrequency or induction technology, while the connected glasses 3 embed a corresponding receiver. The charging process can also be performed by direct electrical connection by means of contact pins in both the support 7 of the docking station 1 and in the connected glasses 3.

In an embodiment, the docking station 1 may also enrich the stored data 111 originating from the connected glasses 3.

For instance, the additional sensors 23 configured to measure data relating to the environment of the docking station 1 may further comprise a microphone, a camera, a motion sensor, or a proximity sensor.

Thus the docking station 1 is able to complement the input of the connected glasses 3 and can serve as a content provider to the user.

To that extent, in an embodiment, the docking station 1 further comprises an interface 29 configured to transmit to the user information related the stored data 111, or processed data originating from a processing process of the stored data 111 by the processing unit 17, or information coming from the additional sensors 23, or information related to the uplink data, or information related to Internet data.

For instance, the processed data maybe average, median, minimum or maximal values of the stored data 111, pertaining for instance to wearing time of the connected glasses 3 or any other data relating to measurements performed by the connected glasses sensors. The information coming from the additional sensors 23 may pertain to temperature, humidity, air quality light level, sound level, or last movement detection.

The information related to the uplink data or to Internet data may include commercial messages, current time, weather forecast, personal agenda, agenda events reminders, notifications, average, median, minimum or any other data processed at the backend platform side, data comparison with other consumers or groups of consumers or any other external content coming from the backend platform 5 or the Internet.

In addition, the interface 29 may also transmit information relating to the status of the synchronization between the database of the backend platform 5 and the input data 91 and relating to the charging status of the connected glasses 3.

The interface 29 is for example a display, a touch screen, or speakers.

The docking station 1 may comprise additional components, such as: interaction buttons, a night light, an UVC LED for disinfecting the connected glasses 3 during the synchronization.

The docking station 1 may comprise additional functionalities, such as an alarm clock, a music player, an interaction unit configured to interact with a smart assistant, games.

It will be now described how the docking station 1 previously described can be used to synchronize data collected by connected glasses 3 of a user with a database of a backend platform 5.

The user places his connected glasses 3 on the support 7 of the docking station 1 in order to synchronize input data 91 collected by the connected glasses 3.

In an embodiment, the synchronization process starts automatically. Once the user has placed the connected glasses 3 onto the support 3, the sensor 19 detects that the connected glasses 3 are positioned on the support 7.

The communication unit of the connected glasses 3 starts sending the input data 91 to the downlink communication unit 9 of the docking station 1. The downlink communication unit 9 transfers the input data 91 to the memory unit 11 of the docking station 1, where they are stored. The input data 91 that are stored in the memory unit 11 are referred to as stored data 111.

The processing unit 17 processes the stored data 111, either on the fly, or once the totality of the input data 91 are stored in the memory unit 11. For instance, the processing unit 17 codes and modulates the stored data 111 so as to obtain output data 131 in accordance with the long-range communication technology used by the uplink communication module 13.

The output data 131 are transferred to the uplink communication module 13, either on the fly while the processing unit 17 processes the stored data 111, or once the totality of the stored data 111 has been processed.

The uplink communication module 13 then transfers the output data 131 to a database of the backend platform 5 immediately as soon as the totality of the input data 91 are stored in the memory unit 11 and as the processing unit 17 has finished processing the stored data 111, or at a later pre-programmed time.

Therefore, the docking station 1 according to the invention advantageously allows the synchronization of the input data 91 collected by the connected glasses 3 of the user with a database of the backend platform 5. The user does not need to have an intermediary portable communication device such as a smartphone (for instance, when the user does not have his smartphone at hand, or when the user is a kid who does not possess a smartphone and would need his parents' smartphone) and may instead place his connected glasses 3 on the support 7 of the docking station 3 when he wants to synchronize the connected glasses 3 with the backend platform 5.

The synchronization can conveniently be done for instance during the night, the docking station 5 charging the connected glasses 3 meanwhile.

In an embodiment, the synchronization process is triggered. The triggering may be carried out in various ways.

In a first example, the communication unit of the connected glasses 3 and the downlink communication module 9 of the docking station 1 uses a Bluetooth technology. When the connected glasses 3 are nearby the dock but not necessarily placed on the support 7 of the docking station 1, the communication unit of the connected glasses 3 is advertising and periodically transmits information packets. By "advertising", it is meant that the communication unit emits a signal indicating its presence in the local environment to other devices able to receive and recognize its signal. The downlink communication module 9 recognizes the advertising of the communication unit. Once the recognition is performed, the downlink communication module 9 gives access to the communication unit. Then the communication unit starts sending the input data 91 to the downlink communication module 9.

In a second example, the communication unit of the connected glasses 3 and the downlink communication module 9 of the docking station 1 uses a Bluetooth technology, but the connected glasses 3 comprise a switch button that, when pressed, activates the advertising of the communication unit. In this case, the user presses the switch button in order to activate the advertising of the communication unit. Then, as in the first example, the downlink communication module 9 recognizes the advertising of the communication unit and gives access to the communication unit. The communication unit starts then sending the input data 91 to the downlink communication module 9.

In a third example, the connected glasses 3 embed a magnetic field generating element which generates a magnetic field and the docking station 1 comprises a magnetic sensor. The magnetic field generating element can be a series of magnets acting as a code and configured to generate a magnetic field identifiable by the magnetic sensor of the docking station 1. The user places the connected glasses 3 on the support 7 of the docking station 1. The magnetic sensor of the docking station 1 detects the magnetic field generated by the magnetic field generating element of the connected glasses 3. As a consequence, the docking station 1 is waken up as well as the downlink communication module 9. Thereupon, the communication unit of the connected glasses 3 starts sending the input data 91 to the downlink communication module 9 using a short-range communication protocol.

In a fourth example, the docking station 1 comprises a magnetic field generating element and the connected glasses 3 embed a magnetic sensor. The user places the connected glasses 3 on the support 7 of the docking station 1. The magnetic sensor of the connected glasses 3 detects the magnetic field generated by the magnetic field generating element of the docking station 1. This detection wakes up the connected glasses 3 and thereupon, the communication unit starts sending the input data 91 to the downlink communication module 9 using a short-range communication protocol.

In a fifth example, the communication unit of the connected glasses 3 and the downlink communication module 9 of the docking station 1 use a NFC technology. In particular, the docking station 1 generates a NFC field. The user places the connected glasses 3 on the support 7 of the docking station 1. The NFC field generated by the docking station 1 wakes up the communication unit of the connected glasses 3. Thereupon, the communication unit starts sending the input data 91 to the downlink communication module 9.

In a sixth example, the support 7 of the docking station 1 includes at least one electrical connector with which at least one electrical connector included in the connected glasses 3 is connected when the connected glasses 3 are positioned on the support 7. The connected glasses 3 comprise an electrical sensor. The at least one electrical connector can be for instance a POGO pin or a plurality of POGO pins. The user places the connected glasses 3 on the support 7 and connects the at least one electrical connector of the connected glasses 3 to the at least one electrical connector included in the support 7. The electrical sensor of the connected glasses 3 detects an electrical signal originating from its physical connection with the support 7 via its at least one electrical connector. This detection wakes up the connected glasses 3 and the communication unit 3 starts sending the input data 91 to the downlink communication module 9.

In a seventh example, the support 7 of the docking station 1 includes at least one electrical connector with which at least one electrical connector included in the connected glasses 3 is connected when the connected glasses 3 are positioned on the support 7. The docking station 1 comprises an electrical sensor. The user places the connected glasses 3 on the support and connects the at least one electrical connector of the connected glasses 3 to the at least one electrical connector included in the support 7. The electrical sensor of the docking station 1 detects an electrical signal originating from the physical connection of the support 7 with the connected glasses 3 via its at least one electrical connector. This detection wakes up the docking station 1 as well as the downlink communication module 9. Thereupon, the communication unit 3 starts sending the input data 91 to the downlink communication module 9.

Once the synchronization is performed, the database of the backend platform 5 comprise raw data that are synchronized with the input data 91.

A client 4 may interact with the backend platform 5 by using the raw data for analysis of the input data 91 from the connected glasses 3. The client 4 may be a vocal assistant, or a website accessible from a computer or any portable electronic device such as a smartphone, or an instant message bot, or a mobile application accessible from any portable electronic device such as a smartphone. The interaction between the client 4 and the backend platform may include extraction of the raw data 51, or processing and transformation of the raw data to create graphs, text or speech.

For instance, the results of the analysis of the input data 91 may indicate that the connected glasses wearing time is not long enough. As a consequence, the client 4 may send to the docking station 1 via the backend platform 5 a message to be displayed to the user, once he wears back his connected glasses 3, that he should wear his connected glasses 3 more often.

When the connected glasses 3 are placed into the docking station 1, energy may be saved and radio pollution may be reduced. For example, when the docking station 1 embeds a magnetic field generating element 21, the magnetic field generating element 21 sets the connected glasses 3 into a sleep mode, as soon as the connected glasses 3 are detected by the docking station 1.

In the case where the communication unit of the connected glasses 3 and the downlink communication module 9 of the docking station 1 uses a Bluetooth technology, the proximity between the connected glasses 2 and the docking station allows reducing the intensity of the Bluetooth signal sent by the connected glasses 3, Thus energy consumption as well as radio pollution are reduced.

In an embodiment, when the user takes the connected glasses 3 off the docking station 1, the connected glasses 3 send a signal to the docking station 1 to inform the docking station 1 that they are not positioned on the support 7. This allows displaying a message, an advice, or a recommendation. This also allows determining whether the connected glasses 3 are positioned on the support 7 of the docking station 1. For instance, when the user is a child, the docking station 1 can send a message to the parents that the connected glasses are not in the docking station 1.

In a variant, the docking station 1 is not dedicated to only one pair of connected glasses. For instance, the docking station 1 is configured to be compatible with a plurality of connected glasses. The docking station 1 is then used for the synchronization of the plurality of connected glasses of for instance a family, or a classroom, or of an eye care professional office, or a plurality of connected glasses from a whitelist of authorized connected glasses.

In another variant, the docking station 1 may not be connected to the Internet and may work in standalone. In this case, the downlink communication module 9 downloads the input data 91 from the connected glasses 3 for a user test for example. In this variant, the docking station 1 may provide information relating to the input data 91 via the interface 29. For instance, in case the docking station 1 is used in an eye care professional office, an eye care professional may use the downloaded data for examination purposes.

In a variant, when the docking station 1 comprises a magnetic field generating element and the connected glasses 3 embed a magnetic sensor, the magnetic field generated by the magnetic field element may, when detected by the magnetic sensor of the connected glasses 3, trigger additional features in the connected glasses 3, for instance a sleep mode. The magnetic field generating element may be a plurality of magnets with determined polarities, powers, or amplitudes.

In a variant, the docking station 1 may embed multiple magnets in order to allow detecting that the connected glasses 3 are on the support 7 for diverse positions of the connected glasses 3 (for instance upside down, temples closed or not), or in order to be compatible with many sizes or shapes of connected glasses to synchronize.

In a variant, the uplink communication module 13 transfers the output data 131 by using an HTTP request, API (application programming interfaces), or any web protocols.

In a variant, the processing unit 17 may processed the stored data 111 to obtain the output data 131 by anonymizing or aggregating the stored data 111.

In another variant, the docking station 1 may be available in different styles, colors, shapes, in order to match user preferences.

The invention claimed is:

1. A docking station for connected glasses, the docking station comprising:
a support for positioning the connected glasses;
a downlink communication module configured to receive input data from a communication unit of the connected glasses;
a memory unit configured to store said input data to obtain stored data;
an uplink communication module configured to transfer output data obtained from said stored data to a backend platform in order to synchronize a database of the backend platform with said input data;
an optical sensor embedded in the docking station configured to detect whether the connected glasses are positioned into the support; and
an interface, wherein
the uplink communication module is further configured to receive uplink data from the backend platform as well as Internet data, and
the interface is configured to transmit to a user at least one of: information related to said output data, information coming from additional sensors embedded in the docking station, information related to the uplink data, and information related to the Internet data.

2. The docking station according to claim 1, wherein the support has a shape adapted to receive and maintain the connected glasses to protect from shocks, and wherein coatings and coverings in contact with the connected glasses prevent scratches of a frame and lenses of the connected glasses.

3. The docking station according to claim 1, further comprising a magnetic field generating element.

4. The docking station according to claim 1, wherein the support comprises at least one electrical connector configured to be connected with one connected glasses electrical connector when the connected glasses are positioned on the support.

5. The docking station according to claim 1, further comprising a calibration unit configured to calibrate or recalibrate sensors embedded in the connected glasses when the connected glasses are positioned on the support.

6. The docking station according to claim 1, wherein:
the interface is configured to transmit: the information related to said output data, the information coming from the additional sensors embedded in the docking station, the information related to the uplink data, and the information related to the Internet data.

7. A method for synchronizing a database of a backend platform with input data from connected glasses, the method comprising:
positioning the connected glasses onto a support of a docking station;
receiving from a communication unit of said connected glasses, by a downlink communication module of said docking station, said input data;
obtaining stored data by storing said input data in a memory unit of said docking station;
transferring, by an uplink communication module of said docking station, output data obtained from said stored data to the backend platform in order to synchronize a database of the backend platform with said output data, wherein the output data are obtained by processing said stored data; and
detecting, by an optical sensor embedded in the docking station, whether the connected glasses are positioned on the support, wherein
the method further comprises
receiving, by the uplink communication module, uplink data from the backend platform as well as Internet data; and
transmitting, by an interface of said docking station, to a user at least one of: information related to said output data, information coming from additional sensors embedded in the docking station, information related to the uplink data, and information related to the Internet data.

8. The method according to claim 7, further comprising triggering the receiving, by the downlink communication module of said docking station, said input data, wherein the triggering is performed as a function of the position of the connected glasses relative to the position of the docking station.

9. The method according to claim 8, wherein the triggering comprises one among:
detecting, by the communication unit of the connected glasses, a wireless signal emitted by the docking station,
detecting, by the docking station, a wireless signal from the communication unit of the connected glasses,
detecting, by a magnetic sensor embedded in the connected glasses, a magnetic field emitted by at least one magnetic field generating element embedded in the docking station,
detecting, by a magnetic sensor of the docking station, a magnetic field emitted by at least one magnetic field generating element embedded in the connected glasses,
detecting, by an electrical sensor of the connected glasses, an electrical signal from an electrical connector of the support of the docking station,
detecting, by an electrical sensor of the docking station, an electrical signal from an electrical connector of the support of the docking station.

10. The method according to claim 7, wherein the downlink communication module of the docking station uses a short-range communication technology and wherein the uplink communication module of the docking station uses a long-range communication technology.

11. The method according to claim 7, wherein
said data that relate to an environment of the docking station is also measured by connected glasses sensors embedded in the connected glasses, and
the method further comprises re-adjusting settings of the connected glasses sensors, based on a combination of the data measured by the additional sensors and the data measured by the connected glasses sensors.

12. The method according to claim 7, further comprising obtaining, by a client, data synchronized with input data from the connected glasses by:
   accessing, by the client, the backend platform, and
   downloading, by the client, raw data stored in the database of the backend platform, said raw data originating from said output data.

13. A docking station for connected glasses, the docking station comprising:
   a support for positioning the connected glasses, the support comprising a recess dedicated to maintain the connected glasses in a fixed position;
   processing circuitry configured to receive input data from the connected glasses;
   a memory configured to store the input data to obtain stored data; and
   an optical sensor embedded in the docking station, wherein
   the processing circuitry is configured to transfer output data obtained from the stored data to a backend platform in order to synchronize a database of the backend platform with the input data,
   the optical sensor embedded in the docking station is configured to detect whether the connected glasses are positioned into the support,
   the processing circuitry is further configured to receive uplink data from the backend platform as well as Internet data, and
   the processing circuitry is further configured to transmit, via an interface, to a user at least one of: information related to said output data, information coming from additional sensors embedded in the docking station, information related to the uplink data, and information related to the Internet data.

14. The docking station according to claim 13, wherein the support is a moulded plastic case comprising the recess.

* * * * *